United States Patent Office 3,118,873
Patented Jan. 21, 1964

3,118,873
WATER-INSOLUBLE MONOAZO-DYESTUFFS
Helmut Gies, Hofheim, Taunus, and Wilhelm Happe, Schwalbach, Taunus, Germany, assignors to Farbwerke Hoechst Aktiengesellschaft vormals Meister Lucius & Brüning, Frankfurt am Main, Germany, a corporation of Germany
No Drawing. Filed Apr. 24, 1961, Ser. No. 104,822
Claims priority, application Germany Apr. 28, 1960
6 Claims. (Cl. 260—205)

The present invention relates to new water-insoluble monoazo-dyestuffs and to a process for their manufacture; more particularly it relates to new monoazo-dyestuffs corresponding to the following general formula

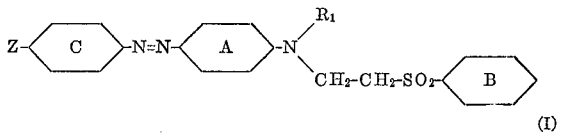

(I)

wherein Z represents a negative substituent which does not impart solubility in water and $R_1$ stands for a hydrogen atom or an alkyl group of low molecular weight, and the benzene nuclei A, B and C may contain further substituents which do not impart solubility in water.

We have found that water-insoluble monoazo-dyestuffs of the general formula mentioned above are obtained by coupling the diazonium compound of an amine of the benzene series which carries in 4-position a negative substituent which does not impart solubility in water and besides may contain in the benzene nucleus further substituents which do not impart solubility in water, with an amine in position 4 of the general formula

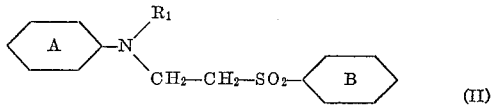

(II)

wherein $R_1$ stands for a hydrogen atom or an alkyl group of low molecular weight and the benzene nuclei A and B may contain substituents which do not impart solubility in water.

As substituents which do not impart solubility in water the benzene nucleus A can contain, for example, halogen atoms, low molecular alkyl groups, low molecular alkoxy groups and/or acylamino groups, the benzene nucleus B can contain, for example, a halogen atom, an alkyl or alkoxy group of low molecular weight, and the benzene nucleus C may carry halogen atoms, alkoxy groups of low molecular weight, trifluoromethyl and/or nitro groups.

As amines which are the basis of the diazo components to be applied and contain in position 4 a negative substituent which does not impart solubility in water, there may be used those 1-aminobenzene derivatives which conatin in position 4 for example a halogen atom, a nitro, nitrile or trifluoromethyl group and which, besides, may be substituted on the benzene nucleus by further groups which do not impart solubility in water such, for example, as halogen atoms, nitro and alkoxy groups.

The amines of the above-mentioned general Formula II which are used as coupling components may be substituted at the benzene nucleus A by groups which do not impart solubility in water such, for example, as halogen atoms, alkyl, trifluoromethyl, alkoxy or acylamino groups, and on the benzene nucleus B by groups which do not impart solubility in water such, for example, as halogen atoms, alkyl, trifluoromethyl or alkoxy groups.

The coupling is effected in an acid medium, if desired in the presence of acid-binding agents such, for example, as sodium acetate, magnesium oxide or pyridine. The new dyestuffs so obtained are suitably worked up in usual manner by kneading with known dispersing agents to obtain dye preparations. The new dyestuffs yield on materials of polyester fibers, especially of polyethylene terephthalate fibers, valuable dyeings possessing excellent properties of fastness, particularly a very good fastness to sublimation. For coloring polyester materials the new dyestuffs are suitably used in the form of the aforesaid dye preparations which are applied in aqueous suspension at temperatures above 100° C. under pressure or at about 100° C. with the addition of usual carriers.

The new dyestuffs yield on materials of polyethylene terephthalate fibers yellow, orange, red, brown and blue tints.

The following examples serve to illustrate the invention but they are not intended to limit it thereto.

*Example 1*

196.5 grams of 2,4,6-trichloro-1-aminobenzene are diazotized in the usual manner and the diazo solution so obtained is slowly added to a solution of 303 grams of 1-(N-4'-methylphenylsulfonylethyl-N - methylamino) - 3-methylbenzene in 1500 grams of hydrochloric acid of 36% strength. After one hour the reaction mixture is made up to 15 liters with water and after 24 hours the separated dyestuff is filtered off and dried. It is an orange crystalline powder which dyes in dispersed form a fabric of polyethylene terephthalate fibers in the pesence of o-phenylphenol as carrier, at 100° C., deep golden yellow tints. The dyeings obtained possess a very good fastness to light and sublimation.

Instead of the above-mentioned o-phenylphenol there may also be used other carriers such, for example, as diphenyl, chlorobenzene and 2-hydroxytoluene-3-carboxylic acid methyl ester.

*Example 2*

207 grams of 2,6-dichloro-4-nitro-1-aminobenzene are diazotized in the usual manner. The diazo solution so obtained is slowly added to a solution of 303 grams of 1-(N-4'-methylphenylsulfonylethyl-N-methylamino) - 3-methylbenzene in 1500 grams of sulfuric acid of 75% strength. After one hour the reaction mixture is made up to 15 liters with water and after 24 hours the separated dyestuff is filtered off and dried. It is a violet brown powder which in dispersion dyes materials of polyethylene terephthalate fibers at 120° C. copper brown tints. The dyeing so obtained possesses a very good fastness to light and sublimation.

The following table contains a number of further water-insoluble monoazo-dyestuffs which may be obtained according to Examples 1 and 2. They correspond to the following formula

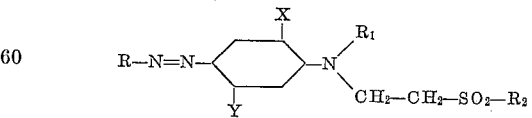

and are distinguished in the following table by the radicals R, $R_1$, $R_2$, X and Y as well as by their tint on materials of polyethylene terephthalate fibers.

| Example | R | X | Y | $R_1$ | $R_2$ | Tint on materials of polyethylene terephthalate fibers |
|---|---|---|---|---|---|---|
| 3 | 2,6-dichloro-4-nitrophenyl | H | H | $CH_3$ | 4-methylphenyl | brown. |
| 4 | ----do---- | H | Cl | $CH_3$ | ----do---- | Do. |
| 5 | ----do---- | $OCH_3$ | $CH_3$ | H | ----do---- | Do. |
| 6 | 2,4,6-trichlorophenyl | $OCH_3$ | $CH_3$ | H | ----do---- | orange. |
| 7 | ----do---- | H | H | $CH_3$ | ----do---- | yellow. |
| 8 | ----do---- | H | Cl | $CH_3$ | ----do---- | Do. |
| 9 | 2,4-dinitro-6-chlorophenyl | H | $CH_3$ | $CH_3$ | ----do---- | violet. |
| 10 | ----do---- | $OCH_3$ | $NHCOCH_3$ | H | ----do---- | blue. |
| 11 | 2,4-dinitro-6-bromophenyl | $OCH_3$ | $NHCOCH_3$ | H | ----do---- | Do. |
| 12 | 2-chloro-4-nitrophenyl | H | $CH_3$ | $CH_3$ | ----do---- | scarlet. |
| 13 | 2,4-dinitro-6-methoxyphenyl | H | $CH_3$ | $CH_3$ | ----do---- | claret. |
| 14 | 4-nitro-2-methoxyphenyl | H | H | $CH_3$ | phenyl | scarlet. |
| 15 | 2-nitro-4-trifluoromethylphenyl | H | $CH_3$ | $CH_3$ | 4-chlorophenyl | orange. |
| 16 | 4-cyano-2,5-dimethoxyphenyl | H | $CH_3$ | $CH_3$ | 4-methoxyphenyl | golden yellow. |
| 17 | 2,4,6-trinitrophenyl | $OCH_3$ | $NHCOCH_3$ | H | 4-methylphenyl | turquoise. |
| 18 | 2,6-dichloro-4-nitrophenyl | H | $CH_3$ | $C_2H_5$ | ----do---- | brown. |

We claim:
1. Water insoluble monoazo-dyestuffs having the formula

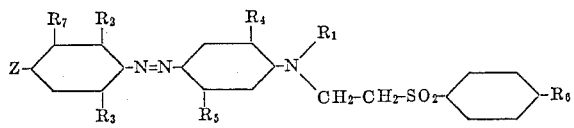

wherein Z represents a member selected from the group consisting of a chlorine atom, nitro, cyano and trifluoromethyl groups, $R_2$ represents a member selected from the group consisting of a hydrogen atom, chlorine atom, bromine atom, methoxy, and nitro groups, $R_3$ represents a member selected from the group consisting of the chlorine atom, methoxy, and nitro groups, $R_4$ represents a member selected from the group consisting of a hydrogen atom and a methoxy group, $R_5$ represents a member selected from the group consisting of a hydrogen atom, a chlorine atom, methyl, and acetylamino atom groups, $R_1$ represents a member selected from the group consisting of a hydrogen atom and a lower alkyl group, $R_6$ represents a member selected from the group consisting of a hydrogen atom, chlorine atom, methyl, and methoxy groups, and $R_7$ represents a member selected from the group consisting of a hydrogen atom and a methoxy group.

2. The water-insoluble monoazo-dyestuff having the formula

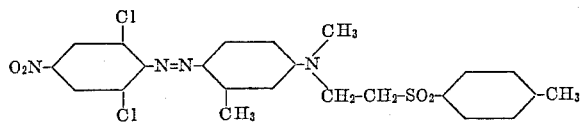

3. The water-insoluble monoazo-dyestuff having the formula

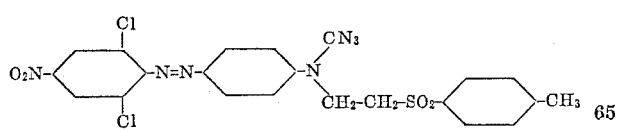

4. The water-insoluble monoazo-dyestuff having the formula

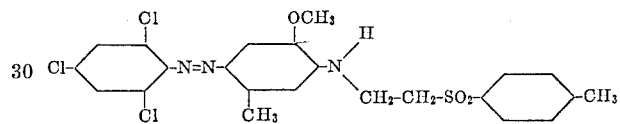

5. The water-insoluble monoazo-dyestuff having the formula

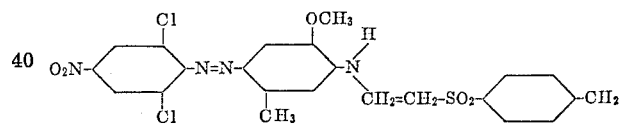

6. The water-insoluble monoazo-dyestuff having the formula

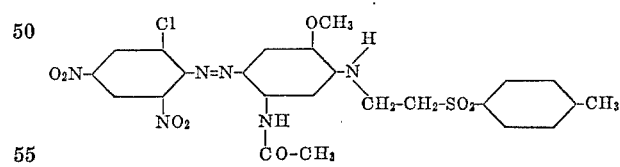

References Cited in the file of this patent

UNITED STATES PATENTS

| | | |
|---|---|---|
| 2,088,327 | Knight | July 22, 1937 |
| 2,131,894 | Knight | Oct. 4, 1938 |
| 2,373,700 | McNally | Apr. 17, 1945 |
| 2,474,736 | Heywood | June 28, 1949 |
| 2,830,043 | Merian | Apr. 8, 1958 |
| 3,077,914 | Dittmar et al. | Nov. 7, 1961 |